US006301606B1

United States Patent
Chessell et al.

(10) Patent No.: US 6,301,606 B1
(45) Date of Patent: Oct. 9, 2001

(54) APPARATUS, METHOD AND COMPUTER PROGRAM PRODUCT FOR CLIENT/SERVER COMPUTING WITH INTELLIGENT LOCATION OF TRANSACTION OBJECTS

(75) Inventors: Amanda Elizabeth Chessell, Alton; Martin Mulholland; Kathryn Sarah Warr, both of Winchester, all of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/094,042

(22) Filed: Jun. 9, 1998

(30) Foreign Application Priority Data

Jan. 16, 1998 (GB) .................................................. 9800830

(51) Int. Cl.[7] .......................... G06F 15/16; G06F 15/177; G06F 13/38
(52) U.S. Cl. ........................... 709/203; 707/103; 705/35; 709/217; 709/219
(58) Field of Search .................................. 395/610, 500, 395/671; 707/103, 204, 4, 10; 705/35; 709/203, 2, 101, 210, 219, 217, 246, 227; 348/8; 364/943.92, 944.6

(56) References Cited

U.S. PATENT DOCUMENTS

| 5,089,954 |   | 2/1992 | Rago ....................................... 395/600 |
| 5,613,148 |   | 3/1997 | Bezviner et al. ....................... 395/800 |
| 5,745,748 | * | 4/1998 | Ahmad et al. .......................... 395/610 |
| 5,761,486 | * | 6/1998 | Watanabe et al. ..................... 395/500 |
| 5,872,971 | * | 2/1999 | Knapman et al. ..................... 395/671 |
| 5,890,161 | * | 3/1999 | Helland ................................. 707/103 |
| 5,923,833 | * | 7/1999 | Freund et al. ......................... 395/182 |
| 5,925,095 | * | 7/1999 | High et al. .............................. 709/2 |
| 5,925,098 | * | 7/1999 | Freund et al. ......................... 709/203 |
| 5,933,816 | * | 8/1999 | Zeanah .................................. 705/35 |
| 5,937,415 | * | 8/1999 | Sheffield et al. ...................... 707/204 |
| 5,958,004 | * | 9/1999 | Helland et al. ....................... 709/101 |

FOREIGN PATENT DOCUMENTS 0737922  10/1996 (EP) .
WO 97/40457  10/1997 (WO) .

OTHER PUBLICATIONS

"Properties of Secure Transaction Protocols", D H Steves et al, Computer Networks and ISDN Systems, vol. 29, No. 15, Nov. 1997, pp. 1809–1821.
"Asynchronous Progressive Transaction Recovery Protocol for Distributed DB/DC Systems", IBM Technical Disclosure Bulletin, vol.29, No. 12, May 1987, pp. 5385–5392.
A Wolisz et al, "Service Provider Selection in an Open Services Environment", Proceedings—Second IEEE Workshop on Future Trends of Distributed Computing Systems, Cairo, Egypt, Sep. 30—Oct. 2, 1990, pp. 229–235.
Mori, Consorti, Integration of clinical information across patient records comparison of mechanisms used to enforce semantic co . . . , Dec. 1998, IEEE.*

* cited by examiner

Primary Examiner—Mark H. Rinehart
Assistant Examiner—Farzaneh Farahi
(74) Attorney, Agent, or Firm—Edward H. Duffield

(57) ABSTRACT

A client processing apparatus for use in a client/server computing system which carries out transactions, issues a begin command to signify the beginning of a transaction; sends a substantive transactional command to a remote server, said command including a transaction context having a specific value which indicates that a transaction has been started but transaction objects which represent the transaction have not yet been created; and receives a modified transaction context from said remote server once said remote server has created said transaction objects.

8 Claims, 3 Drawing Sheets

APPARATUS, METHOD AND COMPUTER PROGRAM PRODUCT FOR CLIENT/ SERVER COMPUTING WITH INTELLIGENT LOCATION OF TRANSACTION OBJECTS

This application is closely related to copending, commonly-assigned application Ser. No. 09/265,910, filed on Mar. 10, 1999, which relies on and presents improvements over this application.

FIELD OF THE INVENTION

The invention relates to the field of client/server (also known as "distributed") computing, where one computing device ("the client") requests another computing device ("the server") to perform part of the client's work. The client and server can also be both located on the same physical computing device.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM"and "OS/2", are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS"is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (called CORBA—the Common Object Request Broker Architecture) has been defined, which provides the object-oriented bridge between the client and the server machines. The ORB decouples the client and server applications from the object oriented implementation details, performing at least part of the work of the first and second logic means 50 and 90 as well as the connection means 80.

As part of the CORBA software structure, the OMG has set forth standards related to "transactions" and these standards are known as the OTS or Object Transaction Service. See, e.g., CORBA Object Transaction Service Specification 1.0, OMG Document 94.8.4. Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g, 10) communicating with one particular server computer (e.g., 20) over a series of client requests which are processed by the server. The OMG's OTS is responsible for co-ordinating these distributed transactions.

Usually, an application running on a client process begins a transaction which may involve calling a plurality of different servers, each of which will initiate a server process to make changes to its local database according to the instructions contained in the transaction. The transaction finishes by either committing the transaction (and thus all servers finalize the changes to their local databases) or aborting the transaction (and thus all servers "rollback" or ignore the changes to their local databases). To communicate with the servers during the transaction (e.g., instructing them to either commit or abort their part in the transaction) one of the processes involved must maintain state data for the transaction. This usually involves the process to set up a series of transaction objects, one of which is a coordinator object which coordinates the transaction with respect to the various servers.

A conventional implementation of the OTS, which was developed by the International Business Machines Corporation and included in its Component Broker Series (a trademark of the IBM Corp.) product announced in May of 1997, is shown in FIG. 2. A client process 21 which wants to begin a transaction (e.g., to withdraw money from a bank account) needs to locate a process which is capable of creating and holding the transaction objects that will maintain the state of the transaction. As the modern tendency is to create clients that are "thin" (and thus have only the minimum functionality), the client process 21 will usually not be able to maintain the transaction objects locally and must look for a server process for this purpose.

According to this prior art approach, the OTS (or another service, such as the CORBA Lifecycle service) searches for a server process on which to create the transaction objects 221 (which include the Coordinator, Control and Terminator objects). The same server process (server A process 22 in FIG. 2) is always chosen according to this prior art. Upon locating the server A process 22, client process 21 sends (arrow with encircled number 1) a message to server A process 22 to instruct server A process 22 to create the transaction objects 221. Server A process 22 then creates transaction objects 221 and sends a reply (arrow with encircled number 2) containing the transaction context to client 21. Client 21 then sends a debit bank account command (arrow with encircled number 3) to server B process 23 (the process containing the bank account object 231 which the client process 21 wishes to withdraw money from). This latter command carries with it the transaction context supplied to the client 21 by the server A process 22. In this way, the bank account object 231 in process 23 can register itself (arrow with encircled number 4) with the transaction objects 221 in process 22 so that the bank account object 231 can be commanded (arrow with encircled number 5) to commit or rollback by the transaction objects 221 at the end of the transaction.

This implementation is inefficient in at least two respects. First, since the same server process is always used when a client is locating a remote process to create and maintain the transaction objects, this server process will soon become overloaded and thus unable to efficiently carry out its own tasks (e.g., updating the contents of local resources). Second, many cross process flows exist between the various processes involved in the transaction. Even if the transaction objects are created and maintained on a random server, the problem of a high number of cross process calls still exists.

SUMMARY OF THE INVENTION

According to a first aspect, the present invention provides a client processing apparatus for use in a client/server computing system which carries out transactions, said apparatus comprising: means for issuing a begin command to signify the beginning of a transaction; means for sending a substantive transactional command to a remote server, said command including a transaction context having a specific value which indicates that a transaction has been started but transaction objects which represent the transaction have not yet been created; and means for receiving a modified transaction context from said remote server once said remote server has created said transaction objects.

According to a second aspect, the present invention provides a server processing apparatus for use in a client/server computing system which carries out transactions, said apparatus comprising: means for receiving a substantive transactional command from a client said command including a transaction context having a specific value which indicates that a transaction has been started by the client but transaction objects which represent the transaction have not yet been created; and means for recognizing the specific value in the transaction context and for locally creating said transaction objects in response to said specific value.

According to a third aspect, the invention provides a method of carrying out the functionality of the client described above in the first aspect.

According to a fourth aspect, the invention provides a method of carrying out the functionality of the server described above in the second aspect.

According to a fifth aspect, the invention provides a computer program product for, when run on a computer, carrying out the functionality of the first aspect.

According to a sixth aspect, the invention provides a computer program product for, when run on a computer, carrying out the functionality of the second aspect.

Since the transaction objects are not created until the client process sends out a substantive transactional command to a server process which will be substantively involved in carrying out the transaction (e.g., has resources that are involved in the transaction) the number of cross process flows is greatly reduced. This can be clearly seen by a simple comparison of FIGS. 2 (the prior art) and 3 (preferred embodiment of the present invention. FIG. 2 has five cross process calls while FIG. 3 has only two.

Another advantage is that the client process does not incur the overhead involved in commanding the creation of the transaction in a dedicated fashion, as in the prior art FIG. 2, arrow with encircled number 1. With the invention, the transaction creation, as far as the client is concerned, is combined with the client's substantive transactional command (e.g., to debit a bank account). The client is thus spared from having to locate a remote server process and from having to issue a create method on this located process.

BRIEF DESCRIPTION OF THE DRAWINGS

The invention will be better understood by the below description of preferred embodiments thereof to be read while referring to the following figures.

DETAILED DESCRIPTION OF THE PREFERRED EMBODIMENTS

The Common Object Request Broker (CORBA) Object Transaction Service (OTS) supplies an interface object known as "Current" which has a "begin" method used by client application programs (source code) to signal a beginning of a transaction to the underlying software layers. According to the preferred embodiment of the present invention, when the client application is being built or executed on a particular client architecture and contains the "begin" method, the underlying software will proceed appropriately to create the transaction by setting up the transaction state objects in a server that is substantively involved in the transaction (e.g., a server that has server resources involved in the transaction).

Figure 3:
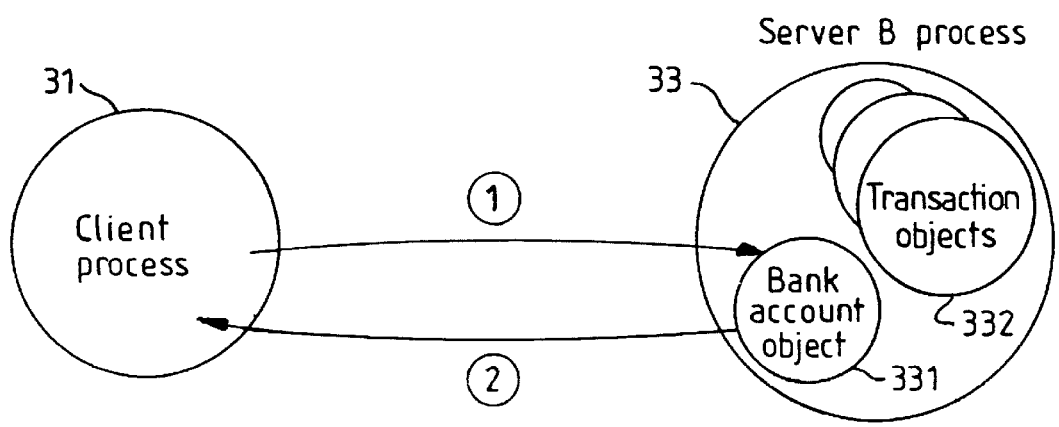
FIG. 3 is a block diagram showing an OTS implementation according to a preferred embodiment of the present invention.
Figure 4:
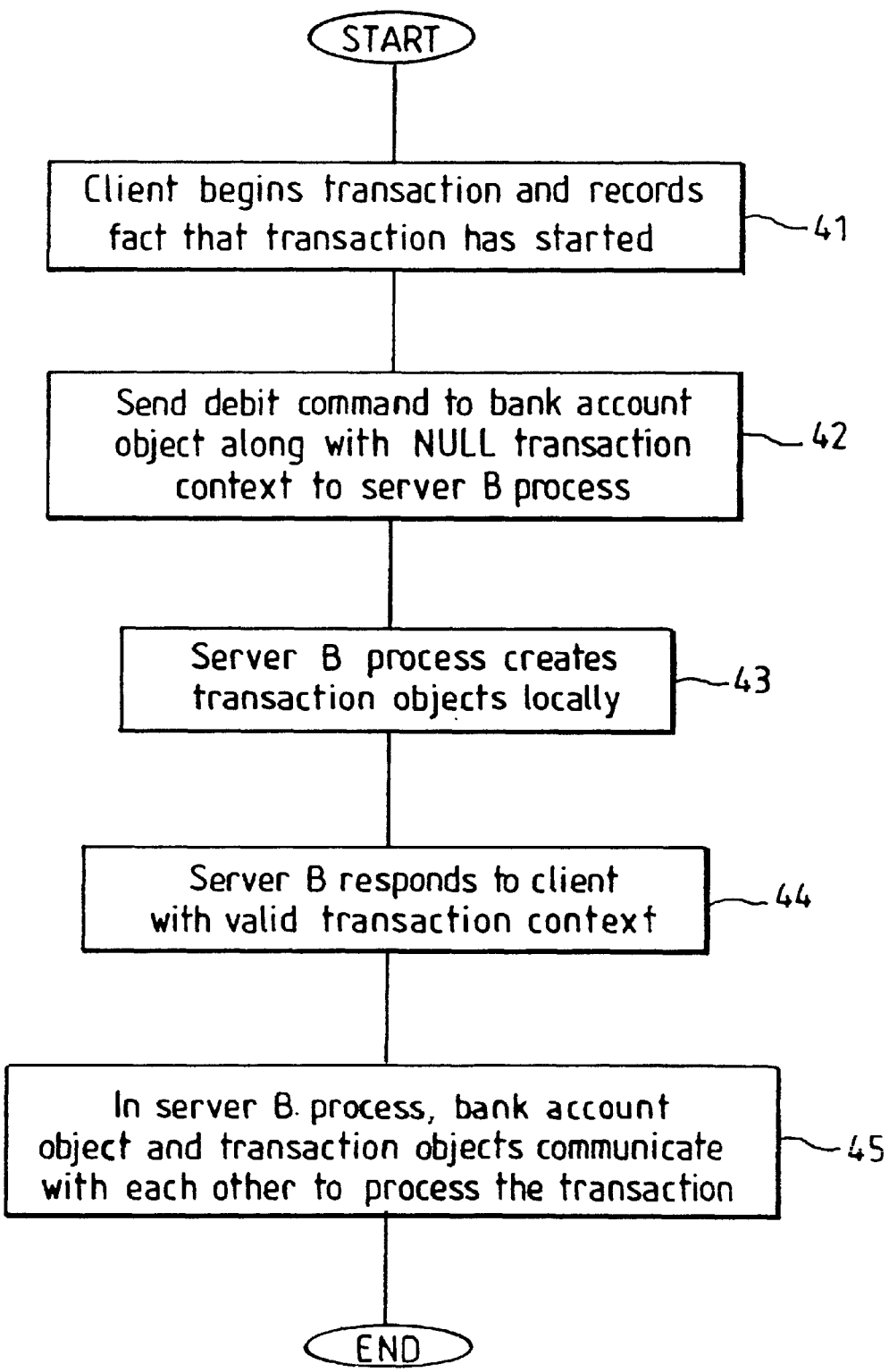
FIG. 4 is a flowchart showing the steps which take place when a client issues a begin command according to the OTS implementation of FIG. 3.

In the preferred embodiment of the present invention, an application running in client process 31 (see FIG. 3) begins a transaction, as usual, by calling the "begin" method on the Current interface object. The client process then records the fact that it has issued this command by, for example, locally creating a minimum set of objects. The above action is illustrated at step 41 of the flowchart of FIG. 4. In this illustrative example, it will be assumed that the transaction being carried out is a withdrawal of money from a bank account, a common transactional operation that is carried out on a daily basis, worldwide, using an Automated Teller Machine (ATM) as the client.

Figure 1:
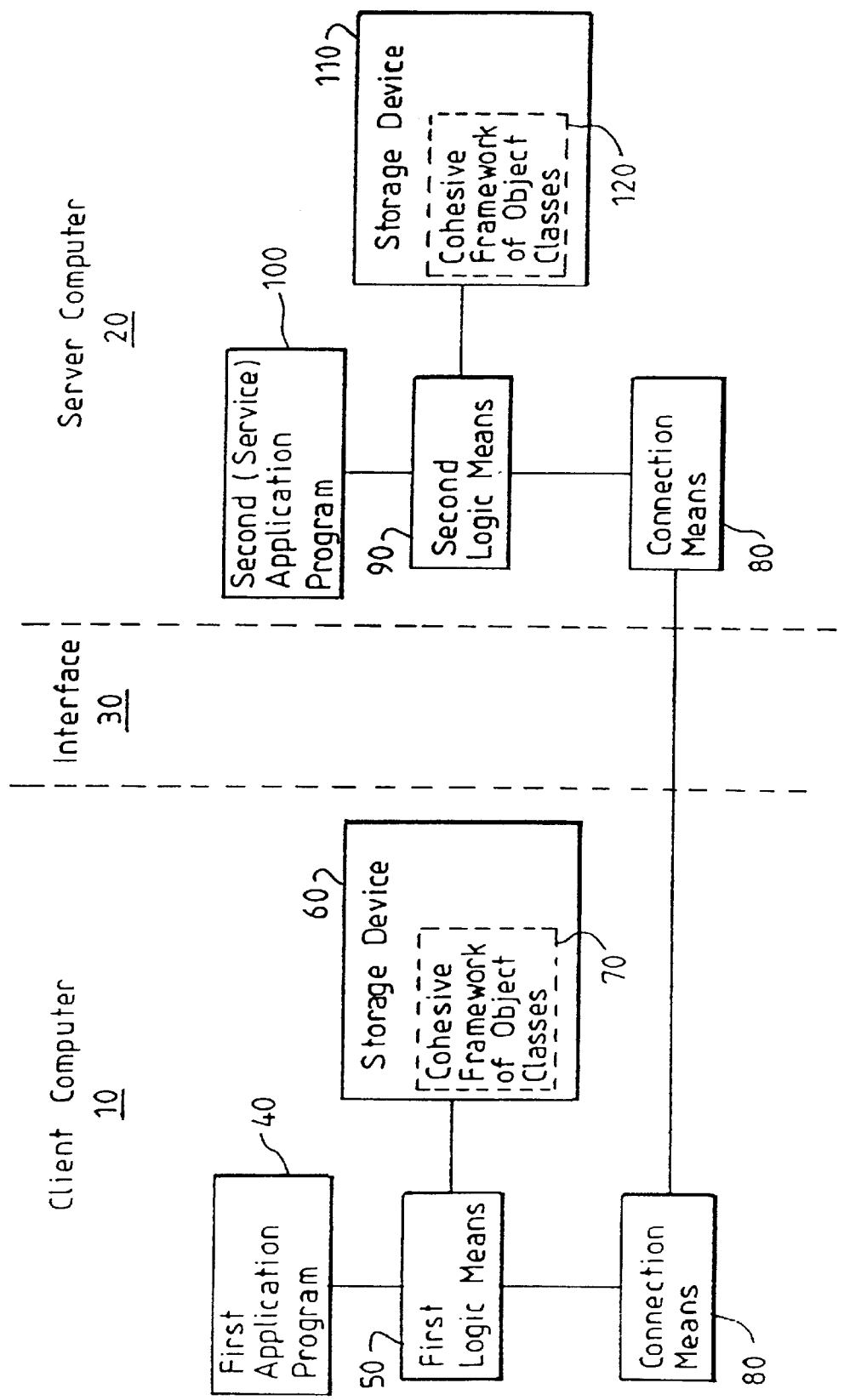
FIG. 1 is a block diagram of a well-known heterogeneous client/server architecture using object technology, in the context of which preferred embodiments of the present invention can be applied.
Figure 2:
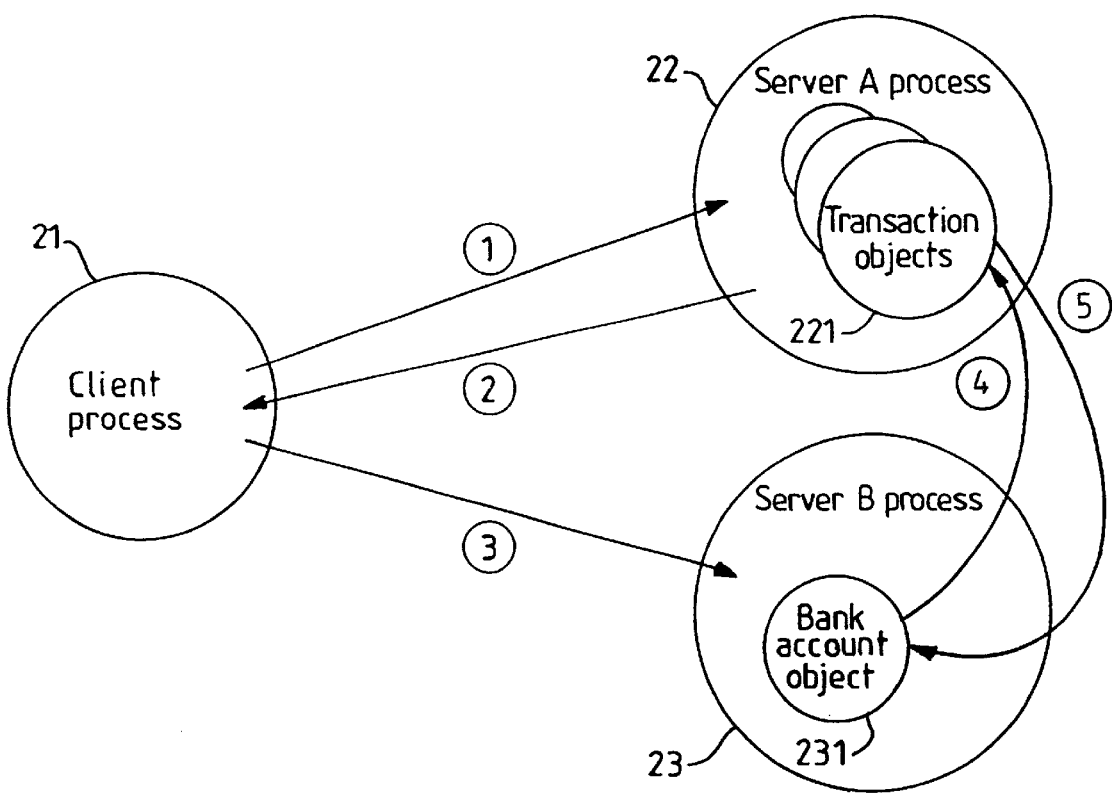
FIG. 2 is a block diagram showing a conventional OTS implementation.

It should be noted that in the prior art, at this stage, a remote process 22 was located and the transaction objects (221 in FIG. 2) were created in that remote process 22. The present invention delays the creation of these transaction objects until a later time, as will be explained below.

The application running in the client process 31 then issues a debit command to bank account object 331 in server B process 33, as the first substantive part of the withdrawal transaction. In this example, the debit command is the first remote flow that the client process makes, in the transaction, after issuing the "begin" command. In making this command, the client process must include some transaction context in the command, so that the bank account object 331 will know that the command is part of a transaction and to identify the specific transaction.

In the prior art (FIG. 2) the client process 21 received the transaction context from the transaction objects 221 set up in the remote process 22. In the preferred embodiment of the present invention, however, the transaction objects have not yet been created and thus could not have provided the client process with the transaction context. Thus, in the preferred embodiment, when the client process 31 sends the debit command to bank account object 331 in remote process 33, a specific transaction context (e.g., a NULL transaction context) is included in the command (arrow with encircled number 1 in FIG. 3). A NULL transaction context means that all of the fields of the transaction context are set to zero. This specific transaction context signifies that a transaction has been started but the transaction objects have not yet been created. This latter operation is illustrated at step 42 in the flowchart of FIG. 4.

When server B process 33 recognizes this specific transaction context (e.g., the NULL transaction context), it is informed that a transaction has been started but the transaction objects have not yet been created. Server B process 33 then creates the transaction objects 332 locally (step 43). Now that the transaction objects 332 are created, the transaction now has a valid transaction context and such a valid transaction context is assigned to the transaction. Server B process then sends a reply (arrow with encircled number 2) to client process 31 to inform the client process 31 of the valid transaction context (step 44 in FIG. 4). Now, the client process has full knowledge of the created transaction.

At this stage, the bank account object 331 communicates (step 45) with the transaction objects 332 in the usual way, except that all of such communication takes place within the same process and thus no cross process flows are required for such communication. In the example, the communication that take place involves the bank account object 331 registering with the transaction objects 332 and, when the transaction is finished, the transaction objects 332 send a commit or rollback command to the bank account object 331.

In an alternative embodiment, the server B process 33 could create the transaction objects at a later time, for example, during resource registration, rather than as soon as the NULL transaction context enters server B process 33.

While a NULL transaction context (with all fields set to zero) has been used in the illustrative embodiment, other specific values of transaction context could also be used. For example, the private data fields of the transaction context could be set to particular values.

We claim:

1. A client processing apparatus for use in a client/server computing system which carries out transactions, said apparatus comprising:

means for issuing a begin command to signify the beginning of a transaction;

means for sending a substantive transactional command as part of said transaction to a remote server, said command including a transaction context having a specific value which indicates that a transaction has been started but transaction objects which represent the transaction have not yet been created thereby deferring the creation of said transaction objects until receipt of said substantive transactional command; and means for receiving a modified transaction context from said remote server once said remote server has created said transaction objects, said modified transaction context corresponding uniquely to said transaction.

2. The apparatus of claim 1 wherein said specific value is a NULL value.

3. A server processing apparatus for use in a client/server computing system which carries out transactions, said apparatus comprising:
- means for receiving a substantive transactional command as part of a transaction from a client said command including a transaction context having a specific value which indicates that a transaction has been started by the client but transaction objects which represent the transaction have not been created;
- means for recognizing the specific value in the transaction context and for locally creating said transaction objects in response to said specific value; and
- means for sending a modified transaction context to the client, said modified transaction context corresponding uniquely to said transaction.

4. The apparatus of claim 3 wherein said apparatus further comprises means for registering a local transactionally involved resource with the locally created transaction objects.

5. A client processing method for use in a client/server computing system which carries out transactions, said method comprising steps of:
- issuing a begin command to signify the beginning of a transaction;
- sending a substantive transactional command as part of said transaction to a remote server, said command including a transaction context having a specific value which indicates that a transaction has been started but transaction objects which represent the transaction have not yet been created, thereby deferring the creation of said transaction objects until receipt of said substantive transactional command; and
- receiving a modified transaction context from said remote server once said remote server has created said transaction objects, said modified transaction context corresponding uniquely to said transaction.

6. A server processing method for use in a client/server computing system which carries out transactions, said method comprising steps of:
- receiving a substantive transactional command as part of a transaction from a client said command including a transaction context having a specific value which indicates that a transaction has been started by the client but transaction objects which represent the transaction have not yet been created;
- recognizing the specific value in the transaction context and locally creating said transaction objects in response to said specific value; and
- sending a modified transaction context to the client, said modified transaction context corresponding uniquely to said transaction.

7. A computer program product stored on a computer readable storage medium for, when run on a computer system carrying out a client processing method for use in a client/server computing system which carries out transactions, said method comprising steps of:
- issuing a begin command to signify the beginning of a transaction;
- sending a substantive transactional command as part of said transaction to a remote server, said command including a transaction context having a specific value which indicates that a transaction has been started but transaction objects which represent the transaction have not yet been created, thereby deferring the creation of said transaction objects until receipt of said substantive transactional command; and
- receiving a modified transaction context from said remote server once said remote server has created said transaction objects, said modified transaction context corresponding uniquely to said transaction.

8. A computer program product stored on a computer readable storage medium for, when run on a computer system carrying out a server processing method for use in a client/server computing system which carries out transactions, said method comprising steps of:
- receiving a substantive transactional command as part of a transaction from a client said command including a transaction context having a specific value which indicates that a transaction has been started by the client but transaction objects which represent the transaction have not yet been created;
- recognizing the specific value in the transaction context and locally creating said transaction objects in response to said specific value; and
- sending a modified transaction context to the client, said modified transaction context corresponding uniquely to said transaction.

\* \* \* \* \*